United States Patent [19]

Licinit et al.

[11] Patent Number: 4,484,472
[45] Date of Patent: Nov. 27, 1984

[54] CONCENTRIC ROD AND TUBE SENSOR FOR THERMAL MASS FLOW CONTROLLER AND FLOW METER

[75] Inventors: Edward J. Licinit; Paul G. Sullivan, both of Montgomery County, Pa.

[73] Assignee: Emerson Electric Co., St. Louis, Mo.

[21] Appl. No.: 467,180

[22] Filed: Feb. 16, 1983

[51] Int. Cl.³ .............................................. G01F 1/68
[52] U.S. Cl. ...................................... 73/204; 138/40; 138/44
[58] Field of Search ....................... 73/204; 138/40, 44

[56] References Cited

U.S. PATENT DOCUMENTS

| | | | |
|---|---|---|---|
| 1,890,985 | 12/1932 | Hamblen et al. | 73/204 |
| 2,406,141 | 8/1946 | Fredericks | 138/40 |
| 4,207,925 | 6/1980 | Nelson | 138/44 |
| 4,339,949 | 7/1982 | Bahner et al. | 73/204 |

Primary Examiner—Herbert Goldstein
Assistant Examiner—Brian R. Tumm
Attorney, Agent, or Firm—Polster, Polster and Lucchesi

[57] ABSTRACT

A concentric rod and tube sensor for a thermal mass flow controller or flow meter is disclosed. The flow meter has a flow passage therethrough for measuring the flow rate of a fluid and includes a heater for heating the fluid flowing therethrough. The flow meter senses the temperature rise of the fluid flowing through the flow path heated by the heater and then generates a signal in response to the temperature rise of the fluid with this signal being proportional to the mass flow rate of the fluid flowing through the flow path. The flow meter includes an inlet bushing having at least one opening therethrough, an outlet bushing having another opening therethrough, a tube extending between and being received by the bushings, and a rod disposed concentrically within the tube. The inlet and outlet bushings receive a respective end of the tube and the rod and positively hold the rod centered within the tube thereby to establish and to maintain a concentric annulus between the outer surface of the rod and the inner surface of the tube for the flow of fluid through the annulus.

12 Claims, 11 Drawing Figures

CONCENTRIC ROD AND TUBE SENSOR FOR THERMAL MASS FLOW CONTROLLER AND FLOW METER

BACKGROUND OF THE INVENTION

This invention relates to a thermal mass controller or flow meter, and more particularly to an improved concentric rod and tube sensor for such a thermal mass flow meter.

In general, thermal mass flow meters are instruments for accurately measuring fluid flow rates, preferably gas flow rates. Typically, such instruments include a flow sensor which generates an output signal proportional to the flow rate of the fluid flowing through the thermal mass flow meter and this output signal can be used for indicating, recording, or controlling the flow rate of the fluid. Oftentimes, the thermal mass flow meter is combined with an automatic controller which regulates the flow to a predetermined flow rate level and thus eliminates the need for continuous monitoring and manual readjustment of fluid pressure so as to provide a uniform gas or fluid flow rate. In one type of known thermal mass flow meter, the sensor is a hollow tube having a heater coil wound therearound. On the inlet and outlet sides of the heater coil, sensor coils are provided on the tube. The heater coil generates a uniform amount of heat which is conducted through the sensing tube to the fluid flowing through the tube. The sensor coils are connected to a balancing bridge and thus detect the resulting temperature differential of the fluid flowing through the sensing tube with the temperature differential being proportional to mass flow rate. Such thermal mass flow meters are commercially available from the Brooks Instrument Division, Emerson Electric Co. of Hatfield, Pa. under the model number DS-5810.

It will be appreciated that the performance of such thermal mass flow meters is linked closely to the heat transfer between the heated portion of the sensing tube and the fluid flowing therethrough. Further, the heat transfer coefficient of the fluid flowing through the sensor tube is highly dependent on boundary layer conditions between the fluid and the surfaces of the sensor tube in contact with the fluid being measured. Oftentimes thermal mass flow controllers are utilized to provide a steady flow of gas to a process, such as is used in the processing of semiconductor materials. Also, such mass flow controllers are utilized to control carrier gasses in gas chromatographs. Typically, the flow rates of these gasses are relatively low, for example, 0–500 sccm.

In such applications, the flow rate of gasses, such as silane, must be accurately regulated. These gasses have a tendency to plug or coat small diameter flow passages within the thermal mass flow meter. However, so as to establish proper boundary layer conditions for accurately regulating the mass flow rate of the gasses, it is necessary to maintain close and precise tolerances within the sensing tube. In an effort to overcome the tendency of small diameter orifices in prior mass flow meter sensor tubes, a so-called concentric rod and tube sensor was developed and has been commercially available from the Brooks Instrument Division, Emerson Electric Co., Hatfield, Pa. as model number DS-5858.

This concentric rod and tube sensor utilized a relatively thin wall outer tube which was sealably fitted within the flow passage through the flow body of the flow meter. The heater coil and sensor coils were applied to the outer surface of the tube in heat transfer relation therewith. At spaced locations along the sensor tube, groups of three inwardly projecting dimples or depressions were formed spaced around the circumference in the tube at the same diametric plane. These dimples or depressions engaged the outer surface of a rod inserted within the tube so as to concentrically locate the rod within the tube and so as to establish a concentric annular flow passage between the inner surface of the tube and the outer surface of the rod. This concentric tube and rod sensing element provided a straight through measuring tube which effectively controlled boundary layer conditions of the gas flowing through the tube and yet permitted the tube and the rod to be readily removed from the flow meter body for periodic cleaning. This concentric annulus overcame the problem of prior thermal mass flow meter using small diameter orifices of becoming plugged.

However, it was difficult to accurately form the depressions in the tube of this prior flow meter so as to precisely establish the concentric relationship of the rod within the tube. Also, it was found during shipping of the flow meter, the rod was oftentimes not positively held in concentric relation within the tube such that the rod would be displaced toward one side of the tube resulting in the annular flow passage becoming eccentric rather than concentric. This eccentricity of the flow passage could so adversely affect the calibration of the instrument such that it would not accurately regulate or control the flow rate of gasses as intended. Also, during disassembly and reassembly of the instrument for cleaning purposes, it was sometimes found that calibration would be affected due to a resulting eccentricity of the flow passage because the rod could not be precisely maintained in coaxial relation with the sensor tube upon re-assembly of the rod within the tube. Still further, it was found that in use, the dimensions of the dimples or depressions in the sensor tube would vary. This was caused by repeated removal and insertion of the rod for cleaning purposes placing a strain on the depressions or dimples which resulted in a permanent deformation thereof. Thus, after time, it was found that an eccentric flow passage would result with a corresponding shift in the calibration of the flow meter.

SUMMARY OF THE INVENTION

Among the several objects and features of this invention may be noted the provision of a thermal mass controller or flow meter, as above described, in which the fluid to be measured flows straight through the flow measuring tube without the necessity of providing auxiliary passages or the like;

The provision of such thermal mass flow meter in which boundary layer conditions of the fluid are accurately controlled thereby to insure repeatability and stability of the calibration of the flowmeter;

The provision of such a flow meter in which the rod may be readily removed from and reinserted within the sensing tube for cleaning;

The provision of such a thermal mass flow meter in which the calibration of the instrument is maintained upon the repeated removal and reinsertion of the rod from within and into sensor tube;

The provision of such a thermal mass flow meter which is significantly more resistive to impact and shock loading, such as may be experienced during shipping or transport of the instrument, than prior flow meters without adversely affecting the calibration of the flow meter; and The provision of such a thermal mass flow meter which accurately controls and regulates the flow rate of fluids at relatively low flow rates, which may be used with fluids having a tendency to foul or plug orifices, which has a long service life, which has a relatively long service period between calibration of the instrument, and which is reliable in operation.

Other objects and features of this invention will be in part apparent and in part pointed out hereinafter.

Briefly stated, this invention relates to a thermal mass flow meter for measuring the flow of a fluid, the flow meter comprising a meter body having a flow passage therethrough. The flow passage has an inlet and an outlet and means is provided for heating the fluid flowing through the flow passage. Further, means is provided for sensing the temperature rise of the fluid flowing through the flow path heated by the heating means. Other means responsive to the above-stated temperature rise is provided for generating a signal proportional to the mass flow rate of the fluid flowing through the flow path. More specifically, the improvement of this invention comprises an inlet bushing having at least one opening therethrough, an outlet bushing having at least one opening therethrough, and a tube extending between the bushings. A rod is disposed concentrically within the tube. Means is provided within the inlet and the outlet bushings for positively holding the rod centered within the tube thereby to establish and to maintain a concentric annulus between the outer surface of the rod and the inner surface of the tube.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
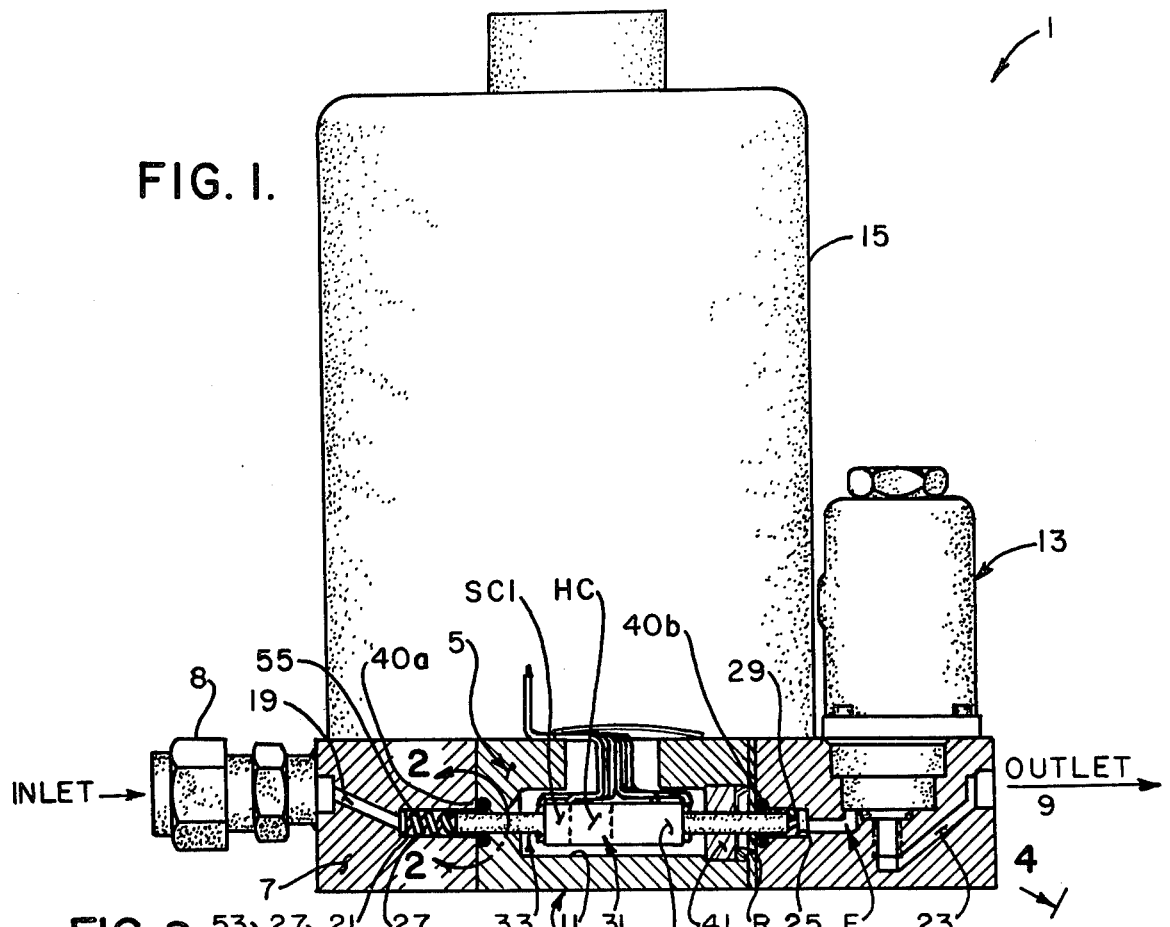
FIG. 1 is a side elevational view of an improved thermal mass flow controller or flow meter of the present invention with the body of the flow meter shown at least in part in vertical cross-section illustrating a flow path extending through the flow meter body and further illustrating a concentric rod and tube sensor in accordance with the improvement of the present invention.

Referring now to the drawings, and more particularly to FIG. 1, a thermal mass flow meter or controller of the present invention is indicated in its entirety by reference character 1. This flow meter may, for example, be an improved flow meter generally similar to model DS-5858 commercially available from the Brooks Instrument Division, Emerson Electric Co., Hatfield, Pa., the assignee of the present invention. Because many of the details of construction and operation of this flow meter are similar to the above-mentioned prior commercially available flow meter, and because these details are generally known to those skilled in the art, this disclosure will focus primarily on the improvements of this invention to this previously commercially available flow meter. Thus, the portions of the flow meter described herein which are common to both the flow meter of the instant invention and to the prior commercially available flow meter will only be described in generalities such as will enable one skilled in the art to understand the environment of the improvement of the instant invention.

Figure 11:
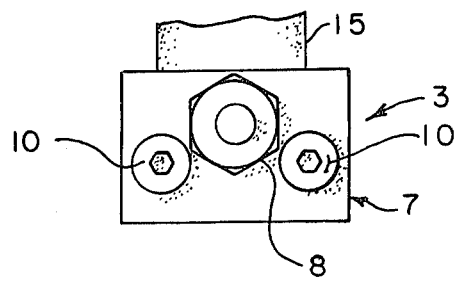
FIG. 11 is left end view of the body of the flow meter shown in FIG. 1.

More specifically, flow meter 1 includes a body, as generally indicated at 3, having a flow path or passage F therethrough with the flow path having an inlet and an outlet. Body 3 comprises a main body 5, an inlet body 7 (at the left hand end of the flow meter as viewed in FIG. 1), and an outlet body 9. Flow meter body sections 5, 7, and 9 may, for example, be fabricated of a suitable metal alloy, such as stainless steel or the like. It will also be understood that inlet and outlet body sections 7 and 9 may be provided with suitable fittings 8 so as to permit the flow meter to be readily connected to a fluid circuit. As is conventional, bolts 10 (see FIG. 11) extend through the inlet and outlet body sections 7 and 9 into threaded openings (not shown) provided in main body section 5 thereby to positively secure the body sections together. A cavity 11 is provided within main body section 5 for purposes as will appear.

As generally indicated at 13, a flow controller valve is provided for regulating or modulating the flow of fluid (e.g., a gas) through flow path F. The flow controller may be programmed in accordance with circuitry (not shown) provided within a cover 15 secured to the upper face of body 3 or may be remotely controlled by a process controller or the like. An input/output cable (also not shown) electronically connects the thermal mass flow controller 1 to remotely located process control equipment in a manner well-known to those skilled in the art. It will be appreciated that neither the construction or operation of flow controller 13, nor the construction or operation of the electronic circuitry of the mass flow controller of this invention is, per se, a part of the present invention and therefore a detailed description of the flow controller and the circuitry will not, for the purposes of brevity, be herein provided.

More specifically, flow path F comprises an inlet passage 19 in inlet body 7. A so-called inlet counterbore 21 is formed at the outlet end of inlet passage 19. Likewise, an outlet passage 23 is provided in outlet body section 9 and an outlet counterbore 25 is provided at the inlet end (i.e., the left end) of outlet passage 23.

In accordance with this invention, an inlet bushing, as generally indicated at 27, is received within inlet counterbore 21 and an outlet bushing, as generally indicated at 29, is removably received within outlet counterbore 25. As generally indicated at 31, a concentric tube and rod flow rate sensor assembly is provided within flow passage F and is supported by inlet bushings 27 and 29. More specifically, flow rate sensor assembly 31 comprises an outer tube 33 having a rod 35 (see FIG. 2) disposed concentrically therewithin. Bushings 27 and 29 constitute means for receiving and holding tube 33 and rod 35 relative to flow meter body 3 and relative to one another and for positively maintaining the rod in concentric relation with the tube thereby to define a concentric annular flow passage, as generally indicated at 39 (see FIG. 2), with this concentric annular flow passage constituting the flow path F through cavity 11 within main body section 5.

It will be understood that by maintaining rod 35 centered within tube 33 and by positively maintaining the concentric annulus 39, uniform, repeatable, and generally linear measurements of the flow rate of fluid flowing through flow path F can be reliably measured or monitored by mass flow meter 1 of the present invention.

As shown in FIG. 1, flow rate sensor 31 includes a heating coil HC (shown in phantom) surrounding at least in part a portion of tube 33 with the heating coil being in heat transfer relation with the tube. On the downstream and upstream sides of the heating coil, temperature sensing coils SC1 and SC2 (also shown in phantom) are provided in heat transfer relation with the tube 33. These coils are bonded to the exterior of tube 33. As is well-known to those skilled in the art, heating coil HC is energized so as to have a predetermined thermal output and the temperature difference of the fluid flowing through annular space 39 between the inner surface of tube 33 and the outer surface of rod 35 may be determined by the temperature sensing coils SC1 and SC2. In response to this thermal differential of the fluid flowing through annular passage 39, circuitry (e.g., a bridge circuit or the like) within cover 15 may be utilized to generate a signal proportional to the flow rate of the fluid flowing through the flow meter. Of course, this output signal may be utilized to generate an error signal in appropriate control circuitry (not shown) so that flow controller 13 may be modulated thereby to regulate the flow of fluid to a predetermined flow rate.

As indicated at 40a, an O-ring seal is provided in a counterbore in main body 5 so that O-ring 40a sealingly engages the outer surface of tube 33 and inlet body 7 thereby to positively seal tube 33 relative to body 3 and to insure that all fluid flowing through flow path F flows through annular passage 39. Similarly, an outlet O-ring seal 40b is provided within a counterbore in outlet body 9. When outlet body 9 is securely bolted to main body 5, outlet O-ring seal 40b sealingly engages the outer surface of tube 33, main body 5, and outlet body 9 thereby to insure that all fluid exiting sensor assembly 31 is directed into outlet passage 23 of flow passage F without leakage. A heat sink 41 is provided in cavity 11 of main body 5 and is in heat transfer relation with tube 33 downstream from the heating and sensing coils and with main body 5. The heat sink is held in place within main body 5 by a retainer R.

Figures 2, 3, 4:
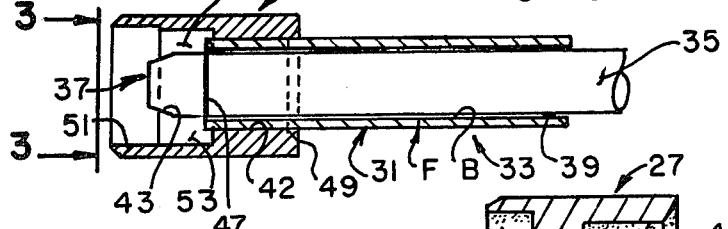
FIG. 2 is a view taken along line 2—2 of FIG. 1 on an enlarged scale illustrating a first embodiment of the present invention including a bushing receiving one end of the tube and further receiving one end of the rod with the bushing positively maintaining the rod in concentric relationship with the tube, it being understood that another similar bushing is present at the other end of the tube.
FIG. 3 is an end view of the bushing taken along line 3—3 of FIG. 2.
FIG. 4 is a diametric cross-section of the bushing taken along line 4—4 of FIG. 3 illustrating an opening for receiving the end of the tube and illustrating a socket for receiving the end of the rod.

Referring now to FIGS. 2–4, inlet bushing 27 will be now described in detail. It will be appreciated that inlet bushing 27 is identical to outlet bushing 29 and thus only a detailed description of the inlet bushing is required. As indicated at 42, a blind, concentric opening or bore is provided in one end of bushing 27 for receiving and socketing a respective end of tube 33. It is preferred that opening 42 have a close tolerance, sliding fit with the outer surface of the end of tube 33 so that opening 42 positively receives and locates the tube in concentric relation with the bushing. A conical socket, as indicated at 43, is concentric relative to opening or bore 42 and the tapered socket converges toward the central longitudinal axis of bushing 29 in a direction away from opening or bore 42. As indicated at A, socket 43 is tapered at an angle, for example 30°.

Figure 5:
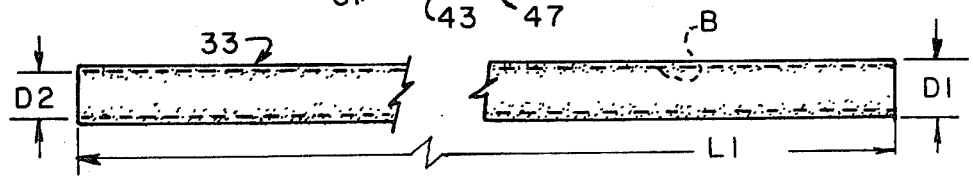
FIG. 5 is a side elevational view of the tube.
Figure 6:
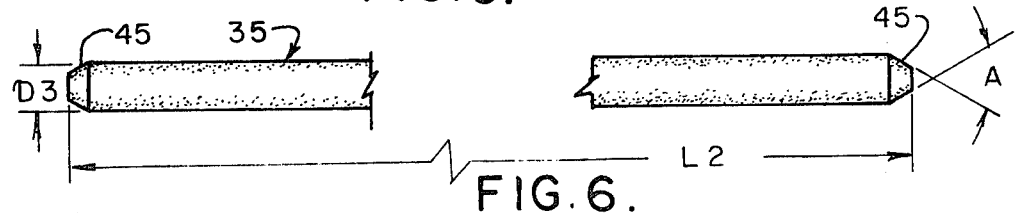
FIG. 6 is a side elevational view of the rod.
Figure 8:
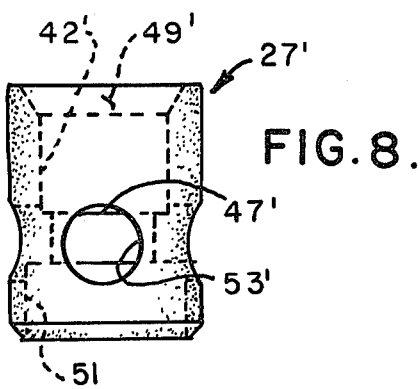
FIG. 8 is a top plan view of FIG. 7.
Figure 7:
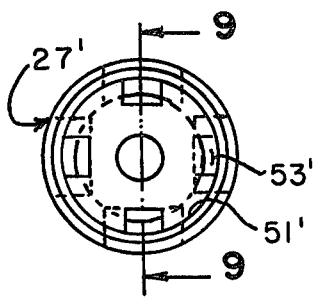
FIG. 7 is an outer end view of another embodiment of a bushing for use with the improvement of this invention.
Figure 9:
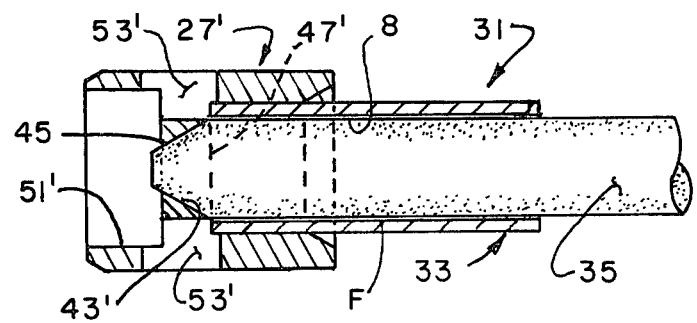
FIG. 9 is a vertical cross-sectional view taken along line 9—9 of FIG. 7 illustrating a sensing tube and rod received therein, similar to FIG. 2.
Figure 10:
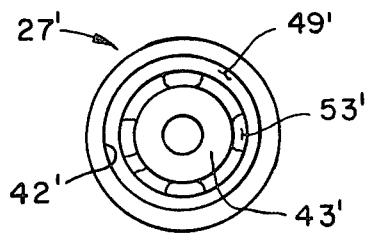
FIG. 10 is a right end view of the bushing shown in FIG. 9.

Referring now to FIGS. 5 and 6, tube 33 is shown to have a predetermined length, as indicated by dimension L1. The outer diameter of tube 33 is indicated by diameter D1 while the inner diameter of the tube is indicated at D2. It will be understood that the tolerances of the inner bore of the tube and the wall thickness of the tube are formed to close tolerances. For example, diameter D2 (the inner diameter of the tube) may be 0.120±0.0005 inches and the wall thickness of tube 33 is maintained at 0.0025±0.0005 inches. Further, the concentricity of the inner diameter of the tube is maintained within 0.002 inches. Further, length L1 of tube 33 may, for example, be 2.238 inches. As shown in FIG. 6, rod 35 has a length L2 of about 2.38 inches and has a diameter D3 of 0.103,+0.000,−0.001 inches. Further, the outer surface of tube rod 35 is finished to have a relatively smooth surface finish (as is the inner bore B of tube 33). Rod 35 has a concentricity of about 0.001 inches.

Rod 35 is provided with beveled ends 45 tapered to an angle A so that they precisely mate with conical socket 43 provided in bushings 27 and 29 and such that the conical sockets matingly engage with the tapered ends 45 of rod 35 so as to precisely locate and maintain the rod in concentric relation with the bushings and so as to positively maintain the rod concentric within tube 33. With tube 33 and rod 35 formed to the above-indicated dimensions, annular passageway 39 will have a generally uniform thickness of about 0.0085 inches. It will be understood, however, that the above-given dimensions for tube 33 and for rod 35 are merely by way of example for one particular configuration of sensor 31. These dimensions may vary considerably, depending on the flow rate ranges of the sensor, the fluids being sensed, the temperature of the fluid being sensed, and other variables.

Referring again to FIGS. 2–4, it will be seen that bushing 27 includes a chamber 49 at the end of opening 42 so as to aid in the insertion of the end of tube 33 into opening 42. Further, the bushing is provided with a counterbore 51 on the end thereof opposite opening 42 with counterbore 51 being of larger diameter than opening 42. Still further, a plurality (e.g., 6 passages) of manifold openings or passages 53 extend generally longitudinally through the portion of the bushing between counterbore 51 and the base of opening 42 with at least a portion of each of the openings 53 being in communication with annular passage 39 between the inner surface of bore B of tube 33 and the outer surface of rod 35 with these passages 53 constituting a portion of flow path F. In this manner, the manifold openings 53 direct the fluid from inlet passage 19 through bushing 27 and into annular flow passage 39. Further, the manifold openings 53 and outlet bushing 29 provide communication between the annular passage 39 and outlet passage 23.

In accordance with this invention, flow meter 1 may be partially disassembled so that sensor rod 35 may be readily removed from the sensor assembly 31 for cleaning of the interior of tube 33 and further such that the rod may be readily reinserted into the sensor tube after the latter has been cleaned. The flow meter body may then be reassembled such that the calibration of flow meter 1 is not substantially affected by the repeated assembly and disassembly of the flow meter. To this end, a compression coil spring 55 is disposed between the outer end of inlet bushing 27 and the base of inlet counterbore 21 so as to resiliently bias inlet bushing 27 together with sensor assembly 31 toward outlet bushing 29 and so as to positively maintain both of the bushings in firm engagement with the ends of tube 33 and so as to further maintain socket openings 43 in positive engagement with the tapered ends 45 of rod 35 thus to maintain concentricity between the rod and the tube.

In order to disassemble flow meter body 3 for removal of rod 35, it is necessary to remove only bolts 10 joining inlet body section 7 to the main body section 5. With the inlet body section 7 removed, one may manually grasp the one end of rod 35 and axially withdraw the rod from sensor tube 33 substantially without disturbing tube 33 or sensor assembly 31. With the rod 35 removed, the tube may be readily cleaned as by swabbing the interior bore of the tube with a suitable solvent. Then, the rod 35 is reinserted into tube 33 so that the outlet end of the rod is again received in outlet bushing 29. The inlet body section 7 is then positioned on main body section 5 such that rod 35 is pocketed in socket 43 of inlet bushing 27 and such that tube 33 is received in opening 42 of the inlet bushing, as shown in FIG. 2. Then, securement bolts 10 are reinserted and tightened. It will be appreciated that because inlet seal 40a is positively maintained in place within main body 5 and because outlet O-ring seal 40b is maintained within its groove in outlet body 9, the seals are positively maintained upon reassembly of the unit. Because of the relatively close tolerances of tube 33, rod 35, and bushings 27 and 29, the rod and tube are maintained in concentric relation, even upon repeated assembly and disassembly. Thus, the calibration of the flow meter is not adversely affected.

Still further, it will be appreciated that because bushings 27 and 29 are positively held within flow meter body 3 and because the tube is positively socketed within openings 42, and further because the tapered ends 45 of rod 35 are socketed within the concentric socket openings 43 of the bushings, the rod is positively maintained in concentric relation relative to the tube. Further, spring 55 positively maintains the ends of the rod and tube in proper engagement with their respective bushings and thus the sensor assembly 31 is not subject to the adverse effects of shock loading and the like, such as may be experienced during shipping of flow meter 1.

Referring to FIGS. 7-10, another embodiment of the bushings utilized to receive tube 33 and to hold rod 35 centered therewithin is shown, this alternate bushing being indicated by reference character 27' and with the "primed" reference characters shown in FIGS. 7-10 indicating structural features of bushing 27' similar in construction and function as the corresponding features of bushing 27 heretofore described. Among the primary differences between bushing 27 and 27' will be noted that in bushing 27, a plurality (e.g., six) of axial manifold passages 53 are provided to provided communication between inlet flow passage 21 and annulus 39 between the inner surface of tube 33 and the outer surface of rod 35 and so as to provide communication between the annulus and outlet passage 23. In bushing 27', the manifold passages 53' are shown to be radial passages. However, it is to be understood that the function of radial manifold passages 53' is similar to passages 53 heretofore described.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

We claim:

1. In a thermal mass flow meter for measuring the flow of fluid therethrough, said flow meter comprising a meter body having a flow path therethrough, the latter having an inlet and an outlet, means for heating said fluid flowing through said flow passage, means for sensing the temperature rise of said fluid flowing through said flow passage heated by said heating means, and means responsive to said temperature rise of said fluid for generating a signal proportional to the mass flow rate of said fluid flowing through said flow passage, wherein the improvement comprises: an inlet bushing within said flow path having at least one opening therethrough, an outlet busing within said flow path having at least one opening therethrough, a tube extending between said bushings, a rod disposed concentrically within said tube, means in said inlet and outlet bushings for positively holding said rod centered within said tube thereby to establish and to maintain a concentric annular opening between the outer surface of said rod and the inner surface of said tube, said annular opening constituting a portion of said flow path.

2. In a thermal mass flow meter as set forth in claim 1 wherein each of said bushings has a bore in one end thereof for receiving a respective end of said tube, and a socket coaxial with respect to said bore for receiving a respective end of said rod, said bore and socket constituting said means for positively holding said rod centered within said tube.

3. In a thermal mass flow meter as set forth in claim 2 wherein said socket has a conical taper converging away from said rod, said conical taper being coaxial with respect to said tube received in said bore of said bushing.

4. In a thermal mass flow meter as set forth in claim 2 wherein said bushing has a plurality of passages therethrough providing communication with said flow path at the end of the bushing opposite said rod and with the concentric annular opening between said rod and said tube.

5. In a thermal mass flow meter as set forth in claim 4 wherein said plurality of passages are generally axial with respect to said rod.

6. In a thermal mass flow meter as set forth in claim 4 wherein said plurality of passages are generally radial with respect to said rod.

7. In a thermal mass flow meter as set forth in claim 1 wherein one of said bushings is in axial engagement with said meter body, and wherein said flow meter further includes spring means interposed between said meter body and the other of said bushings thereby to resiliently bias said other bushing and said tube and said rod into engagement with said bushings.

8. In a thermal mass flow meter as set forth in claim 1 further comprising seal means engagable with the outer surface of said tube thereby to prevent the flow of fluid past the outer surface of said tube.

9. In a thermal mass flow meter as set forth in claim 1 wherein said meter body comprises a main body, an inlet body, and an outlet body, fastener means for positively securing said inlet and outlet bodies to said main body, said inlet bushing being received within said inlet body, said outlet bushing being received within said outlet body, and seal means adjacent the inlet and outlet ends of said tube sealingly engageable with said tube and said meter body for preventing the flow of fluid between said meter body and the outer surface of said tube.

10. In a thermal mass flow meter as set forth in claim 9 wherein one of said end bodies may be removed from the main body so as to permit removal and reinsertion of said tube and rod within said flow meter.

11. In a thermal mass flow meter for measuring the flow of fluid therethrough, said flow meter comprising a meter body having a flow path therethrough, the latter having an inlet and an outlet, means for heating said fluid flowing through said flow passage, means for sensing the temperature rise of said fluid flowing through said flow passage heated by said heating means, and means responsive to said temperature rise of said fluid for generating a signal proportional to the mass flow rate of said fluid flowing through said flow passage, wherein the improvement comprises: an inlet bushing within said flow path, an outlet bushing within said flow path, a tube extending between said bushings, a rod disposed concentrically within said tube, means in said inlet and outlet bushings for positively holding said rod centered within said tube thereby to establish and to maintain a concentric annular flow passage between the outer surface of said rod and the inner surface of said tube, each of said bushings having a plurality of openings therethrough for providing communication with said flow path at the end of the bushing opposite said rod and with the annular flow passage between said rod and said tube.

12. In a thermal mass flow meter for measuring the flow of fluid therethrough, said flow meter comprising a meter body having a low passage therethrough, the latter having an inlet and an outlet, means for heating said fluid flowing through said flow passage, means for sensing the temperature rise of said fluid flowing through said flow passage heated by said heating means, and means responsive to said temperature rise of said fluid for generating a signal proportional to the mass flow rate of said fluid flowing through said flow passage, wherein the improvement comprises: an inlet bushing within said meter body, an outlet bushing within said meter body, a tube extending between and received by said bushings, a rod disposed concentrically within said tube, means in said inlet and outlet bushings for receiving a respective end of the tube and of said rod so as to positively hold said rod centered within said tube thereby to establish and to maintain a concentric annular flow passage between the outer surface of said rod and the inner surface of said tube, each of said bushings having a bore in one end thereof for receiving a respective end of said tube, and a socket coaxial with respect to said bore for receiving a respective end of said rod, each of said bushings having at least one opening therethrough for providing communication with a portion of said flow passage at the end of the bushing opposite said rod and with the annular flow passage between said rod and said tube, said flow meter further including a spring interposed between said meter body and one of said bushings thereby to resiliently bias said bushings and said tube and rod into engagement with one another.

* * * * *